United States Patent [19]

Horrall et al.

[11] Patent Number: 4,674,124

[45] Date of Patent: Jun. 16, 1987

[54] MULTICHANNEL MASKING SOUND GENERATOR

[75] Inventors: Thomas R. Horrall, Harvard, Mass.; Richard A. Greiner, Madison, Wis.

[73] Assignee: Bolt Beranek and Newman Inc., Cambridge, Mass.

[21] Appl. No.: 741,966

[22] Filed: Jun. 6, 1985

[51] Int. Cl.[4] .................... G01K 11/00

[52] U.S. Cl. .................... 381/73.1; 380/6

[58] Field of Search .................... 179/1.5 M; 381/73

[56] References Cited

U.S. PATENT DOCUMENTS

| | | | |
|---|---|---|---|
| 3,647,968 | 3/1972 | Argimbau et al. | 381/73 |
| 3,980,827 | 9/1976 | Sepmeyer et al. | 179/1.5 M |
| 4,010,324 | 3/1977 | Jarvis et al. | 179/1.5 M |
| 4,052,564 | 10/1977 | Propst et al. | 381/73 |
| 4,052,720 | 10/1977 | McGregor et al. | 381/73 |
| 4,054,751 | 10/1977 | Calder et al. | 381/73 |
| 4,059,726 | 11/1977 | Watters et al. | 179/1.5 M |
| 4,133,977 | 1/1979 | McGuire et al. | 179/1.5 M |
| 4,438,526 | 3/1984 | Thomalla | 381/73 |
| 4,473,906 | 9/1984 | Warnaka et al. | 381/73 |
| 4,476,572 | 10/1984 | Horrall et al. | 381/73 |

*Primary Examiner*—Salvatore Cangialosi

*Attorney, Agent, or Firm*—Pahl, Lorusso & Loud

[57] ABSTRACT

In the masking sound source disclosed herein, easily adjustable but matching acoustic energy spectrums are obtained from different channels by providing, for each channel, a plurality of bandpass filters, each of which is provided with a respective gain-controlled amplifier for selectively adjusting the respective signal level. The bandpass characteristics of each filter are matched to the corresponding filter in each other channel and a common control signal is applied to the respective gain-controlled amplifiers. The filtered and level-adjusted signals for each channel are then summed and applied to respective power amplifiers suitable for energizing loudspeakers. Accordingly, the frequency spectrum applied to all loud speakers will be the same even though the signals applied may be incoherently related within the spectrum.

3 Claims, 2 Drawing Figures

MULTICHANNEL MASKING SOUND GENERATOR

BACKGROUND OF THE INVENTION

The present invention relates to a masking sound generator and, more particularly, to a multi-channel masking sound generator which provides multiple channels of masking sound signals which are matched in spectrum although incoherently related within the spectrum.

As is known in the art, see for example U.S. Pat. Nos. 4,059,726 and 3,980,827, it is advantageous, in the generation of a masking sound field, that the signals from adjacent loudspeakers should not be coherently related within the masking spectrum since coherency causes disturbing variations in local intensity due to cancellation and reinforcement effects. Accordingly, it is increasingly recognized as good practice to provide multiple signals which are incoherently related as to frequencies within the masking spectrum. Such signals may, for example, be provided by means of a multiple output random noise generator of the type disclosed in copending, co-assigned U.S. Ser. No. 303,496.

It is also understood in the art, however, that it is typically necessary to tailor the electrical power spectrum applied to the loudspeakers in order to produce the desired acoustic spectrum within the environment in which the masking field is to be applied. Further, this tailoring of the spectrum must typically be adjusted or fit to each specific application since the sound absorbing characteristics of walls and furniture within the environment will typically vary from one situation to the next. Similiarly the frequency responses of different types of loud speakers will also vary from situation to situation. As will be understood by those skilled in the art, it can be a difficult and time-consuming procedure to adjust each filter set so as to empirically obtain a desired acoustic spectrum within a given environment. Further, the difficulty is greatly compounded if multiple channels, each containing its own filter set, must be separately adjusted and tailored to yield the same acoustic spectrum.

Among the objects of the present invention may be noted a provision of a novel multi-channel masking sound generator; the provision of such a generator which facilitates the matching of spectrums between several channels provided by the generator; the provision of such a generator which provides multiple channels which are matched in spectrum but which are incoherently related for frequencies within the spectrum; the provision of such a generator which is easily adjusted; the provision of such a generator which is highly stable and reliable and which is of relatively inexpensive and simple construction. Other objects and features will be in part apparent and in part pointed out hereinafter.

BRIEF DESCRIPTION OF THE DRAWING

Corresponding reference characters indicate corresponding parts throughout the several views of the drawings.

DESCRIPTION OF PREFERRED EMBODIMENT

Figure 1:
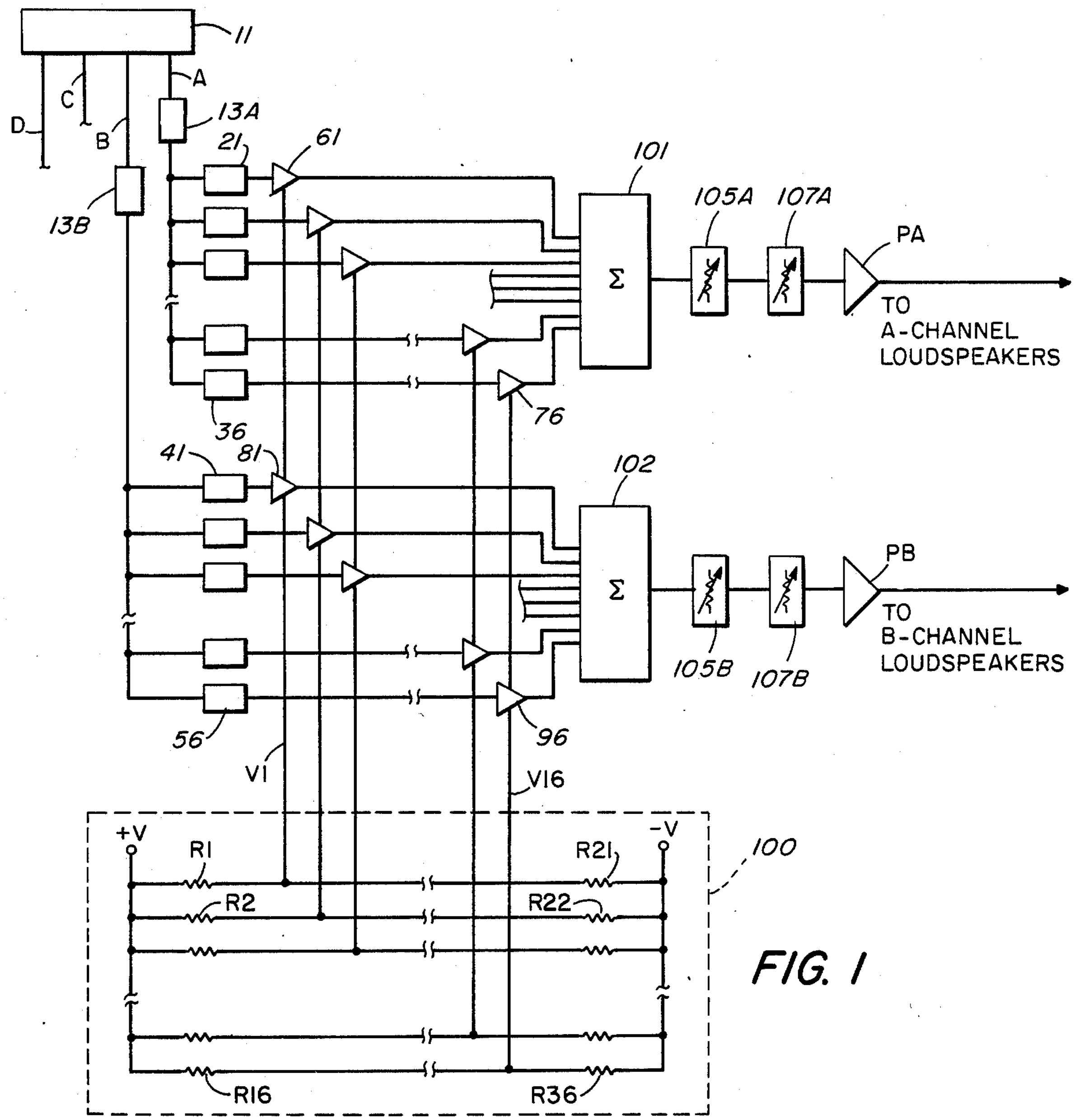
FIG. 1 is a schematic diagram of a multichannel masking sound generator constructed in accordance with the present invention.
Figure 2:
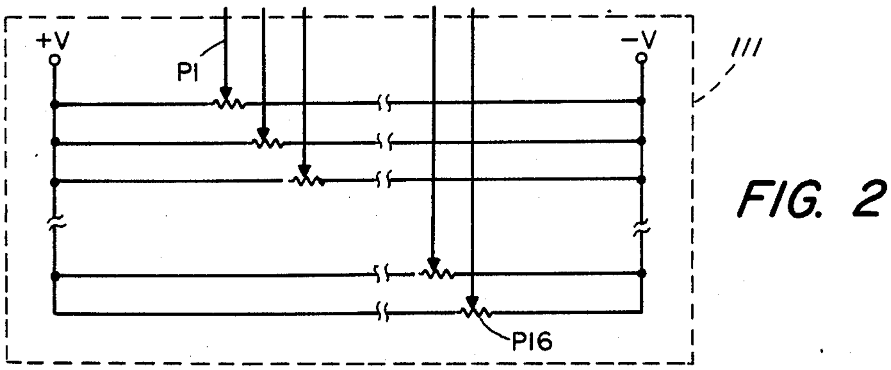
FIG. 2 is a schematic diagram of a potentiometer board which may be substituted for a resistance divider network in the circuit of FIG. 1 for the empirical adjustment of control voltages.

Referring now to the drawing there is indicated at reference character 11 a digital, psuedo-random signal generator e.g. of the type disclosed in greater detail in the U.S. Ser. No. 303,496, noted previously. As is understood, such a signal generator may, for example, comprise a relatively long shift register provided with multiple feedback paths so that the contents of the shift register change in a manner which is suitably random within the frequency spectrum of interest i.e. the only periodicity occurs at frequencies well below the spectrum of interest. By tapping the shift register at various points, multiple output signals, designated A–D, are obtained which have similiar spectral content but which are incoherently related within the range of desired sound masking frequencies.

In the particular embodiment described herein by way of illustration, two channels of matched and adjusted spectral content are provided; but, as will be understood by those skilled in the art, additional channels may be provided in the same fashion for those situations where more than two incoherently related channels are needed, for example, as in the partition mounted sound masking system described in U.S. Ser. No. 303,496, noted previously.

The source signals obtained from the two channels utilized, i.e. A and B, are first applied to respective high pass filters 13A and 13B to remove frequency components below the desired masking spectrum. Each of the source signals is then applied to a respective multiplicity of bandpass filters, i.e. channel A is applied to filters 21–36 and channel B is applied to filters 41–56. To provide the flexibility of adjustment desired, sixteen filters are used for each channel, each filter covering a ⅓ octave range within the desired masking spectrum. Nominal center frequencies for the filters may, for example, be 160, 200, 250, 315, 400, 500, 630, 800, 1,000, 1,250, 1,600, 2,000, 2,500, 3,150, 4,000 and 5,000 hertz respectively. Further, the bandpass filters connected to each source signal match those connected to the other source signal i.e. the filter 21 is identical to the filter 41 and so on.

Connected to the output of each of the bandpass filters is a respective voltage controlled amplifier, these being designated by reference characters 61–76 in Channel A and reference characters 81–96 in channel B.

For each frequency segment, the same control voltage is applied to the corresponding gain controlled amplifiers for the different channels. For example, the same control voltage is applied to the amplifier 61 as to the amplifier 81 and so on. Further, if additional channels, e.g. C–D, are utilized, the same control voltage is applied to that gain controlled amplifier which is operative on the same frequency segment for the additional channel. The several control voltages are designated V1–V16 and, in actual practice, are obtained from a divider network, designated generally by reference character 100. Each control voltage V1–V16 is derived from a representative voltage divider comprising a pair of resistors connected in series between a regulated positive reference voltage (+V) and a regulated negative reference voltage (−V). For example, the voltage Vl is obtained from the junction between a pair of resistors Rl and R21, voltage V2 from the junction between the pair of resistors R2 and R22, and so on. Depending on the value of the respective control voltage, the audio signal level obtained from each bandpass filter is adjusted to a corresponding level.

The level adjusted signals for each channel are applied to a summing network, designated by reference characters 101 and 102, respectively. As will be understood, the output signals from each summing network will thus be a shaped spectrum signal, the shape depending upon the relative values of the several control voltages.

The output signals from the summing networks are applied, through ganged attenuators 105A–B and 107A–B to respective power amplifiers PA and PB suitable for driving loudspeakers. For convenience in adjusting the overall sound pressure level, the attenuators 105A and 105B preferably provide ten dB steps while the attenuators 107A and 107B provide one dB steps.

Preferably, the resistive divider network 100 is fabricated on a removable multi-pin header block, which is easily removed from or substituted in the overall circuit once the particular values for resistors R1–R16 and R21–R36 are determined by means of empirical tests. For the performance of these empirical tests, which determine the actual power spectrum to be applied to the loud speakers, it is convenient to substitute, for the network 100, a panel 111 of potentiometers P1–P16 which is connected e.g. through a flexible cable, to the socket which normally receives the header holding the network 100. Accordingly, during testing of the environment in which the masking sound field is to be applied, e.g. through the use of a calibrated microphone and spectrum analyzer, the spectrum can be empirically adjusted and measured with great ease. Then, after the appropriate value for each of the control signals V1 and V16 is determined, the network 100 can be made up using resistor values selected to give the desired control voltage values.

Since the same control signal adjusts the output level for the same range of frequencies for both channels, it can be seen that very accurate matching of the two channels will be obtained, even though the instantaneous signals may be incoherently related within the range of frequencies included in the masking spectrum, and this desirable matching is obtained whether the setup potentiometer panel is utilized or the fixed resistor network 100. By this scheme, it is thus possible to finally calibrate the permanent sound source at relatively low cost, while only a single one of the relatively expensive potentiometer panels is required for multiple installations, that is, this component need only be possessed by the consultants or installers of the sound masking system and need not be part of the cost of each individual installation.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A multichannel masking sound source comprising:

a psuedo random noise generator providing at least first and second noise source signals which have the same spectral content but which are incoherently related within the desired noise masking spectrum;

connected to each source signal, a multiplicity of bandpass filters, each corresponding to a different frequency range within said spectrum, the filters connected to each source signal being matched with those connected to the other source signal;

for each bandpass filter, a gain controlled amplifier for selectively adjusting the signal level obtained through the respective filter;

for each set of frequency matched bandpass filters, means for applying a preselected control signal in common to the respective gain-controlled amplifiers, thereby to match the signal levels obtained through the respective filters a respective means for summing the signals obtaining through each multiplicity of bandpass filters, thereby to obtain a respective shaped spectrum signal;

linked gain control means for commonly adjusting the level of said shaped spectrum signals; and power amplifier means suitable for energizing loudspeakers from said level adjusted, shaped spectrum signals, whereby the frequency spectrum applied to all loudspeakers will be the same even though the signals applied to different speakers may be incoherently related within the spectrum.

2. A multichannel masking sound source comprising:

a psuedo random noise generator providing a plurality of noise source signals which have the same spectral content but which are incoherently related within the desired noise masking spectrum;

connected to each source signal, a multiplicity of bandpass filters, each corresponding to a different frequency range within said spectrum, the filters connected to each source signal being matched in bandpass characteristics with those connected to the other source signal;

for each bandpass filter, a gain controlled amplifier for selectively adjusting the signal level obtained through the respective filter;

for each set of frequency matched bandpass filters, resistive divider means for applying a preselected control signal in common to the respective gain-controlled amplifiers, thereby to match the signal levels obtained through the respective filters;

a respective means for summing the signals obtaining through each multiplicity of bandpass filters, thereby to obtain a respective shaped spectrum signal;

linked gain control means for commonly adjusting the level of said shaped spectrum signals;

a plurality of loudspeakers for each noise source signal; and respective power amplifier means suitable for energizing the respective plurality of loudspeakers from each of said level adjusted, shaped spectrum signals, whereby the frequency spectrum applied to all loudspeakers will be the same even though the signals applied to different speakers may be incoherently related within the spectrum.

3. A method for energizing loudspeakers with shaped spectrum signals, such that the frequency spectrum applied to all loudspeakers will be the same even though the signals applied to different speakers may be incoherently related within the spectrum, said method comprising:

obtaining from a psuedo random noise generator at least first and second noise source signals which have the same spectral content but which are incoherently related within the desired noise masking spectrum;

connecting to each source signal a multiplicity of bandpass filters, each corresponding to a different frequency range within said spectrum, the filters connected to each source signal being matched with those connected to the other source signal, each bandpass filter being provided with a gain-controlled amplifier for selectively adjusting the signal level obtained through the respective filter;

applying a preselected control voltage in common to the respective controlled amplifiers for each set of matched bandpass filters thereby to match the signal levels obtained through the respective filters;

summing the signals obtaining through each multiplicity of bandpass filters, thereby to obtain respective shaped spectrum signals; and power amplifying and applying to respective groups of speakers said shaped spectrum signals.

* * * * *